Patented June 27, 1933

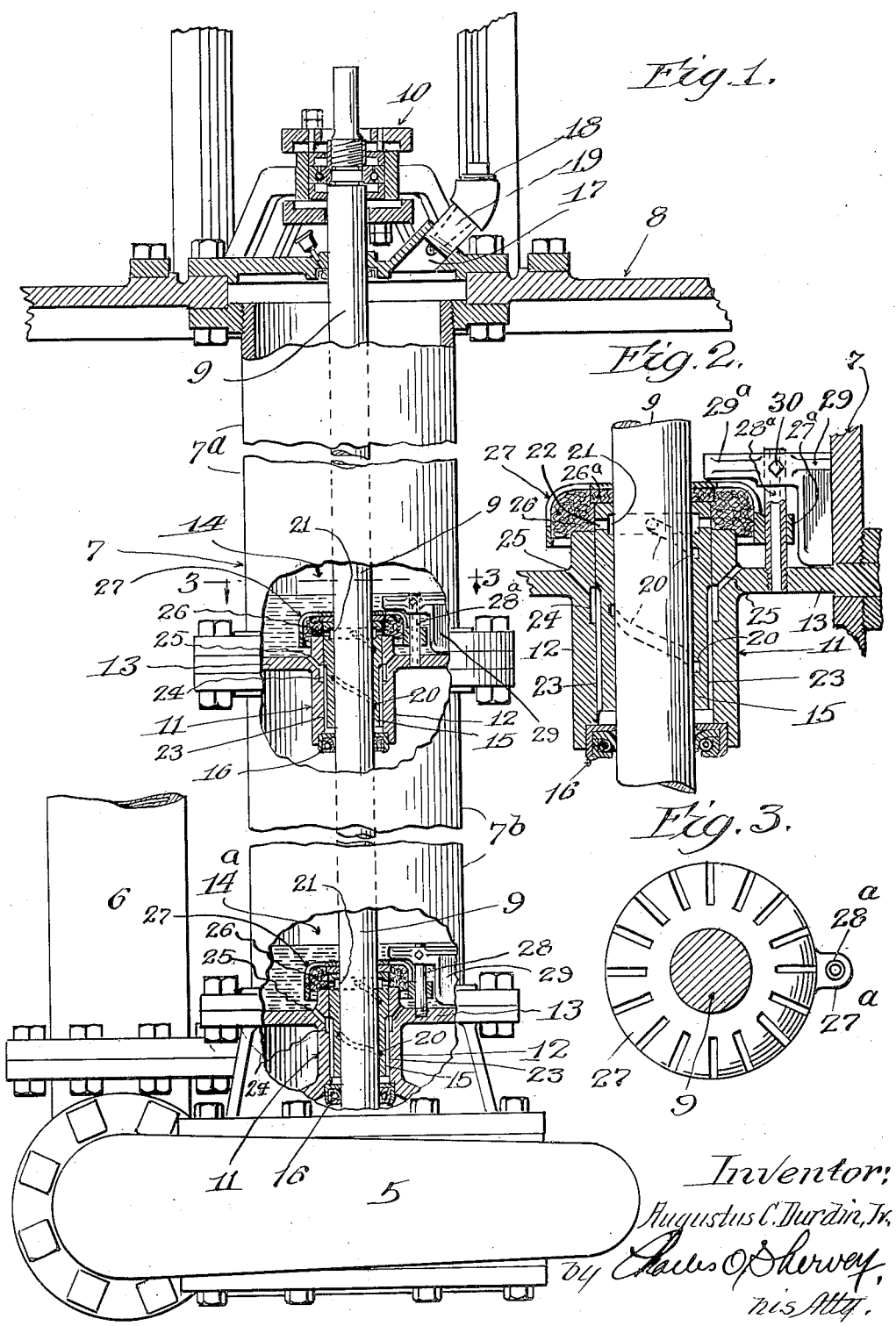

1,915,652

UNITED STATES PATENT OFFICE

AUGUSTUS C. DURDIN, JR., OF CHICAGO, ILLINOIS, ASSIGNOR TO CHICAGO PUMP COMPANY, OF CHICAGO, ILLINOIS, A CORPORATION OF ILLINOIS

LUBRICATING MEANS FOR PUMP SHAFTS

Application filed August 24, 1929. Serial No. 388,055.

This invention relates to lubricating means for pump shafts, and has particular reference to vertical pumps, such as bilge pumps, and the like. Pumps of this character are usually submerged or partially submerged in water or other liquid, which has a tendency to enter the bearings of the pump shaft, thereby greatly impairing their usefulness. In many installations the pump shaft is of considerable length and bearings are provided at several places along its length, which must be properly lubricated to guard against friction.

One object of this invention is to provide a hanger pipe for the pump, which pipe also serves as a reservoir for the lubricating oil. Another object is to provide a hanger pipe having a plurality of shaft bearings therein for the pump shaft and individual oil chambers for supplying oil to the bearing contained in an associated chamber.

Another object is to provide means for forcing the oil from the chambers through the bearings and back into the chambers, whereby the oil may be used over and over again. Another object is to provide a seal for the shaft below each oil chamber, whereby the oil is prevented from leaking out and whereby water or other liquid, which is being handled, may not enter the bearings.

Another object is to provide means for filtering the oil upon entering the bearings, whereby any grit or other extraneous matter will not be carried into the bearings.

Other objects and advantages will appear in the course of the following specification, and with all of said objects and advantages in view, this invention consists in lubricating means for shafts embodying a hanger pipe serving as an oil reservoir for containing lubricating oil for the shaft bearings. It further consists in lubricating means embodying a hanger pipe divided into chambers for containing oil for lubricating bearings contained in the several chambers.

It further consists in lubricating means as above set forth in which the oil is pumped through the bearings and back into the chambers. It further consists in lubricating means as above set forth in which the oil is filtered upon entering the bearings.

It further consists in lubricating means in which a measured or predetermined quantity of oil is contained in an upper chamber or chambers and any surplus oil is permitted to overflow into the lower chamber or chambers. It further consists in lubricating means as above set forth in which the oil is sealed against escape and the water or other liquid handled is prevented from entering the bearings.

It further consists in the several novel features of construction, arrangement and combinations of parts hereinafter described and claimed.

The invention is clearly illustrated in the accompanying drawing in which—

Figure 1 is a view partly in side elevation and partly in vertical longitudinal section of a pump (partly broken away) and showing the same equipped with a simple form of the present invention;

Fig. 2 is an enlarged vertical detail section taken at one of the bearings; and

Fig. 3 is a horizontal cross section taken on the line 3—3 of Fig. 2.

Referring to said drawing, which illustrates one embodiment of the invention, the reference character 5 designates the pump casing of the pump in which is contained the impeller (not shown), and from which casing leads the discharge pipe 6. The casing has the usual inlet opening through which the liquid enters the casing, as is well understood.

The casing 5 is bolted or otherwise secured to a hanger pipe 7, which extends upward from the casing to a cover plate or other supporting member 8 to which it is bolted or otherwise secured. The hanger pipe 7 may be made in sections, if desired, as shown at 7$^a$ and 7$^b$, having bolted together flanges on their adjacent ends. Upon the cover plate or supporting member 8 is mounted a motor (not shown), the shaft of which is connected to the pump impeller by a pump shaft 9. A bearing 10 is provided for the upper end of the pump shaft and one or more other bearings are provided for said shaft along its length, as shown at 11, the lowermost one being preferably placed adjacent the impeller.

The bearings 11 are carried in housings 12, usually cast as a part of horizontal or cross walls or partitions 13, which divide the hanger pipe into a plurality of chambers 14 and 14ª. Bearing bushings 15, secured in said housings, are provided for the shaft, and seal rings 16 below said bushing are provided for preventing the escape of oil from the clearance space between the shaft and the bushings and for preventing the entrance of water or other liquid to said clearance space. The seal rings may be of any desirable form, and conveniently may take the form of those illustrated in the drawing.

The hanger pipe 7 provides a reservoir for holding a quantity of oil for each bearing contained in the hanger pipe, and when a plurality of bearings are carried in the hanger pipe, the chambers 14 and 14ª afford individual containers for oil for the bearing associated therewith. A filler opening 17 is provided at the top of the hanger pipe which is closed by a plug 18 and a strainer 19 may be provided at the filler opening to strain out any solid material that might otherwise enter the hanger pipe.

In order to force the oil through the bearings, a helical oil groove or duct 20 is provided at the clearance space of each bearing 11, which groove may be formed on the internal face of the bearing bushing 15 or on the face of the shaft. In the drawing, the grooves 20 are shown as formed upon the bushings (see Fig. 2), and each extends downward from an annular groove 21 at the upper end of the internal face of the bushing to the lower end thereof. Several ports or passages 22 extend outwardly from each annular groove 21 and communicate with the chamber 14 or 14ª which supplies oil to the associated bearing. Oil entering the helical groove is forced downward along the adjacent cylindrical faces of the shaft and bushing while the shaft is rotating, thereby supplying the necessary lubricant for the shaft bearing.

Leading up from the lower end of each bushing is a groove, or several grooves or ducts, 23, which grooves may be formed on the external face of the bushing to provide passageways for the return of the oil to the oil chamber. The grooves 23 are located between the external faces of the bushings and the internal faces of the housings and open into a horizontal annular groove 24 from which lead discharge ports 25 that open out into the bottom of the oil chamber. It will be understood, therefore, that the lower end of the housing being sealed against leakage, oil entering the helical groove will be forced downward through the clearance space between the shaft and bushing, thereby lubricating the shaft at the bearing, and after passing through said groove it will be forced up the return grooves 23 and out through the discharge ports 25 back into the oil chamber from whence it came.

For the purpose of filtering the oil entering a bearing, a body of filtering material 26 is placed around the upper end portion of the housing, thereby covering the inlet ports 22 to the helical groove 20, and a cage 27, here shown as comprising a radially slotted inverted cup-like member, is provided for enclosing the filtering material. Said cage 27 is secured in place by a stud 28 fastened in a cross wall 13 and engaged in a lug 27ª formed on the cup. Preferably a felt washer 26ª is placed between the cup 27 and bushing 15.

When several bearings 14, 14ª are employed for the pump shaft, an overflow member is provided for each of the upper oil chambers, whereby a predetermined quantity of oil may be left in said upper oil chamber or chambers, and any surplus quantity may discharge therefrom into a lower chamber. Conveniently, the stud, indicated by 28ª (see Fig. 2) and contained in each chamber above the lowermost one, is made hollow and opens out through the cross wall 13, thereby permitting oil accumulating above the top of the hollow stud to discharge through the same into the chamber therebelow.

For preventing the oil from being swirled around in the oil chamber, a baffle plate 29 is provided in each chamber. Said baffle plates are here shown as secured upon the studs 28 and 28ª by set screws 30. Conveniently, the baffle plates 29 may have lugs 29ª formed thereon which project over the cages 27 and prevent accidental upward movement thereof.

In use, a sufficient quantity of lubricating oil is poured into the filler opening 17 to supply a measured quantity to the upper oil chamber or chambers, as the case may be, and the lowermost one. Surplus oil in the upper chamber or chambers overflows through the hollow stud or studs and enters the chamber below. When necessary, fresh oil may be added by introducing the same through the filler opening.

From the above it is apparent that the several oil chambers are supplied with oil from the one filler opening, and that a quantity of oil is left in each individual oil chamber. Also, that oil from each chamber is forced through the bearing associated with the chamber, thereby lubricating the shaft, and returned to the chamber, and that the oil is filtered as it enters the bearing. Furthermore, that the oil is prevented from escaping from the bottom of each bearing and water or other liquid is prevented from entering the bearings from below. Furthermore, that the hanger pipe serves as a reservoir for the lubricating oil for the shaft bearings, and that when divided into individual chambers for associated bearings, a separate body of lubricating oil is provided for the associated bearing. Furthermore, that filtered oil is supplied to each bearing.

While the invention has been shown and described in connection with a pump, its use is not limited thereto as it may be used wherever applicable.

More or less variation of the exact details of construction is possible without departing from the spirit of this invention. I desire, therefore, not to limit myself to the exact form of the construction shown and described, but intend, in the following claims, to point out all of the invention disclosed herein.

I claim as new, and desire to secure by Letters Patent:

1. The combination with a rotating shaft, of a tubular member serving as a lubricating oil reservoir and having a cross wall forming the bottom of said reservoir, a bearing in which said shaft is journaled, partly contained in said tubular member and partly below and supported by said cross wall, there being a helical oil duct between the shaft and bearing provided with an inlet at the upper end of the bearing communicating with said reservoir and an outlet at the bottom of the bearing communicating with said reservoir through an upwardly leading duct, whereby oil may be circulated from the reservoir down through said bearing and back to the reservoir, and a filter over the inlet to said helical oil duct.

2. The combination with a rotating shaft, of a tubular member serving as a lubricating oil reservoir and having a cross wall forming the bottom of said reservoir, a bearing in which said shaft is journaled, contained in said tubular member and supported by said cross wall, there being a helical oil duct between the shaft and bearing provided with an inlet at its upper end communicating with said reservoir and an outlet at its lower end communicating with the reservoir through an upwardly leading duct, whereby oil may be circulated from said reservoir down through said bearing and back to the reservoir, a filter over the inlet to said helical oil duct, and sealing means at the lower end of said bearing for sealing said bearing against leakage.

3. The combination with a rotating shaft, of a tubular member serving as a lubricating oil reservoir and having a cross wall forming the bottom of the reservoir, a stationarily supported baffle plate extending inwardly from the tubular member and serving to prevent swirling of the oil in the reservoir, a bearing for said shaft carried by said cross wall and having means for circulating lubricant through said bearing, a filter overhanging the bearing and a post secured to the cross-wall to which the baffle plate and filter are anchored.

4. The combination with a rotating shaft, of a sectional tubular member surrounding said shaft and serving as a lubricating oil reservoir, separately formed cross walls secured between adjacent sections of the tubular member and providing bottoms for several oil chambers, an overflow pipe secured in and opening through an upper cross wall, a baffle plate extending inwardly from the tubular member and secured upon said overflow pipe and serving to prevent swirling of oil in the associated oil chamber, bearings carried by said cross wall and having sealing means at their lower ends and means for circulating oil through the bearings, and filters over said bearings anchored to said overflow pipe.

5. The combination of a vertical shaft, a tubular member surrounding the shaft and serving as an oil reservoir, internal cross-walls secured to said tubular member and forming the bottoms of individual oil chambers, shaft bearings for said shaft, one associated with each cross-wall and receiving oil from the associated oil chamber, sealing members between the shaft and the lower ends of the bearings, and an overflow pipe in an upper oil chamber extending up from the bottom thereof through which the lower oil chamber is supplied with oil.

AUGUSTUS C. DURDIN, Jr.